United States Patent [19]

Harris et al.

[11] 4,050,603
[45] Sept. 27, 1977

[54] CLAMP FOR SECURING BAR HANGER TO ELECTRICAL WIRING BOX

[75] Inventors: Robert M. Harris, Vienna, W. Va.; Gene F. Mills, Belpre, Ohio; David T. Shaffer, Parkersburg, W. Va.

[73] Assignee: Union Insulating Company, Parkersburg, W. Va.

[21] Appl. No.: 729,967

[22] Filed: Oct. 6, 1976

[51] Int. Cl.² ............................................. H02G 3/08
[52] U.S. Cl. ...................................... 220/3.9; 248/57; 248/318; 248/DIG. 6
[58] Field of Search .................. 248/49, 50, 54 R, 57, 248/58, 62, 63, 65, 68 R, 72, 74 R, 74 A, 74 B, 205 R, 318, 343, DIG. 6; 24/249 R, 255 R, 257 R, 259 R, 259 C, 255 C; 220/3.2-3.94; 174/58, 63

[56] References Cited
U.S. PATENT DOCUMENTS

| | | | |
|---|---|---|---|
| 1,506,330 | 8/1924 | Vandy | 174/63 X |
| 1,622,087 | 3/1927 | Calderwood | 248/57 X |
| 1,667,025 | 4/1928 | Bowers | 220/3.9 |
| 1,786,004 | 12/1930 | Clayton | 248/DIG. 6 |
| 1,806,840 | 5/1931 | Campbell | 24/259 R X |
| 2,379,568 | 7/1945 | Ellinwood | 248/74 B X |
| 2,423,627 | 7/1947 | Tinnerman | 248/74 B X |
| 3,243,151 | 3/1966 | Varney et al. | 248/74 R |
| 3,389,885 | 6/1968 | Friedman et al. | 248/49 X |
| 3,773,968 | 11/1973 | Copp | 220/3.9 X |
| 3,913,773 | 10/1975 | Copp et al. | 220/3.3 X |

*Primary Examiner*—Stephen Marcus
*Attorney, Agent, or Firm*—Peter Xiarhos; Elmer J. Nealon; Norman J. O'Malley

[57] ABSTRACT

A clamp for securing an adjustable bar hanger to a molded thermosetting plastic electrical wiring box. The clamp includes a generally U-shaped portion having a deformable tab directed into the region defined by the U-shaped portion and a pair of side flanges integral with and on opposite sides of the U-shaped portion. A bar hanger is positioned within the U-shaped portion of the clamp and the wiring box is oriented with respect to the clamp and bar hanger assembly so that the bar hanger is captured between the clamp and a rear wall of the wiring box and the clamp is spaced a slight distance from the rear wall of the wiring box. Screws are then inserted through openings provided in the rear wall of the wiring box and threaded into corresponding threaded openings provided in the flanges of the clamp. As the screws advance into the openings in the flanges, the clamp is drawn toward the wiring box, causing the deformable tab of the U-shaped portion to deform and move in a direction away from the wiring box and toward the U-shaped portion of the clamp. The deformation of the tab serves to distribute the torque or energy applied to the screws throughout the entire clamp in a manner so as to prevent damage to the wiring box, such as cracking or shattering.

7 Claims, 7 Drawing Figures

CLAMP FOR SECURING BAR HANGER TO ELECTRICAL WIRING BOX

BACKGROUND OF THE INVENTION

The present invention relates to a clamp, and more particularly, to a clamp for clamping an adjustable bar hanger against a molded thermosetting plastic electrical wiring box without causing physical damage to the wiring box such as cracking or shattering.

Bar hangers for use with molded thermosetting plastic electrical wiring boxes for positioning the electrical wiring boxes with respect to supporting structures, for example, between studs or joists, are well known in the art. These bar hangers are normally mounted or secured to electrical wiring boxes, for example, in a factory assembly operation, and are commonly adjustable lengthwise in the field to permit installers in the field to accommodate the wiring boxes to variations in spacing between studs or joists.

In one well known assembly of a thermosetting plastic electrical wiring box and bar hanger, the bar hanger is first positioned within a generally U-shaped portion of a clamp having side flanges, and the wiring box is positioned with respect to the clamp and bar hanger assembly so that the bar hanger is captured between the clamp and a rear wall of the wiring box with the flanges of the clamp being spaced a slight distance from the rear wall of the wiring box. At the same time, openings provided in the rear wall of the wiring box are aligned with corresponding threaded openings provided in the flanges of the clamp. Metal screws are then inserted by screw-insertion apparatus through the openings in the rear wall of the wiring box into the threaded openings in the clamp, and a rotational torque is applied to the screws to thread the screws into the threaded openings in the flanges. As the screws are tightened, the clamp is drawn toward the rear wall of the wiring box and the bar hanger is caused to be clamped and retained in position against the wiring box. Desirably, the metal screws are tightened by an amount no more than is necessary to insure that the bar hanger will not become loosened and separate from the rest of the assembly during shipment of the assembly. Further, the screws should not be tightened so much as to cause the wiring box to crack or shatter at the points or region of entry of the screws into the wiring box, thereby rendering the wiring box non-usable.

While the abovedescribed assembly operation has been used successfully for some time, it is possible, due to inherent variations in wiring boxes, clamps and bar hangers and inherent variations in assembly operations, for the screw-insertion apparatus to occasionally apply an excessive amount of force or torque to screws and cause a wiring box to be cracked, shattered, or otherwise damaged and thereby rendered non-usable. This result is possible since the screw-insertion apparatus, being mechanical and non-human in nature, is unable to exercise the degree of control and discretion over its screw-tightening operations that an installer would in the field. The present invention is directed to a solution to the above problem.

BRIEF SUMMARY OF THE INVENTION

In accordance with the present invention, a clamp is provided for assembly with a bar hanger and electrical wiring box which overcomes the problem as described hereinbefore. The clamp in accordance with the invention includes a generally U-shaped portion, a first flange extending outwardly from one side of the generally U-shaped portion, and a second flange extending outwardly from the other side of the generally U-shaped portion. The generally U-shaped portion further has a deformable means, for example, in the form or nature of a deformable tab, directed from the horizontal portion of the generally U-shaped portion into the region defined by the generally U-shaped portion, and the first and second flanges each further have an opening therein. The openings in the flanges are adapted to correspond and to be used in conjunction with openings provided in a wall of the wiring box. The latter may be of a material such as a thermosetting plastic composition.

The clamp as described hereinabove is operative when a bar hanger is to be secured to the aforesaid wall of the wiring box to receive the bar hanger within the generally U-shaped portion thereof and to capture the bar hanger against the wall of the wiring box with the deformable means bearing against the bar hanger and the first and second flanges being spaced from the wall of the wiring box with the openings in the flanges being positioned for cooperation with the openings in the wall of the wiring box. The openings in the flanges are adapted to be used with fasteners and with the openings in the wall of the wiring box to draw the clamp in a direction toward the wall of the wiring box for securing the clamp and the bar hanger within the generally U-shaped portion to the wall of the wiring box. The deformable means operates when the clamp is drawn toward the wall of the wiring box to deform and to move in a direction away from the wall of the wiring box and toward the horizontal portion of the generally U-shaped portion of the clamp. The deformation of the deformable means as described above serves to distribute the energy applied to the fasteners in a manner so as to prevent damage to the wiring box, such as cracking or shattering.

BRIEF DESCRIPTION OF THE DRAWING

Various objects, features and advantages of a clamp as employed with a bar hanger and an electrical wiring box in accordance with the present invention will be apparent from the following detailed discussion taken in conjunction with the accompanying drawing in which.

DETAILED DESCRIPTION OF THE INVENTION

Figure 1:
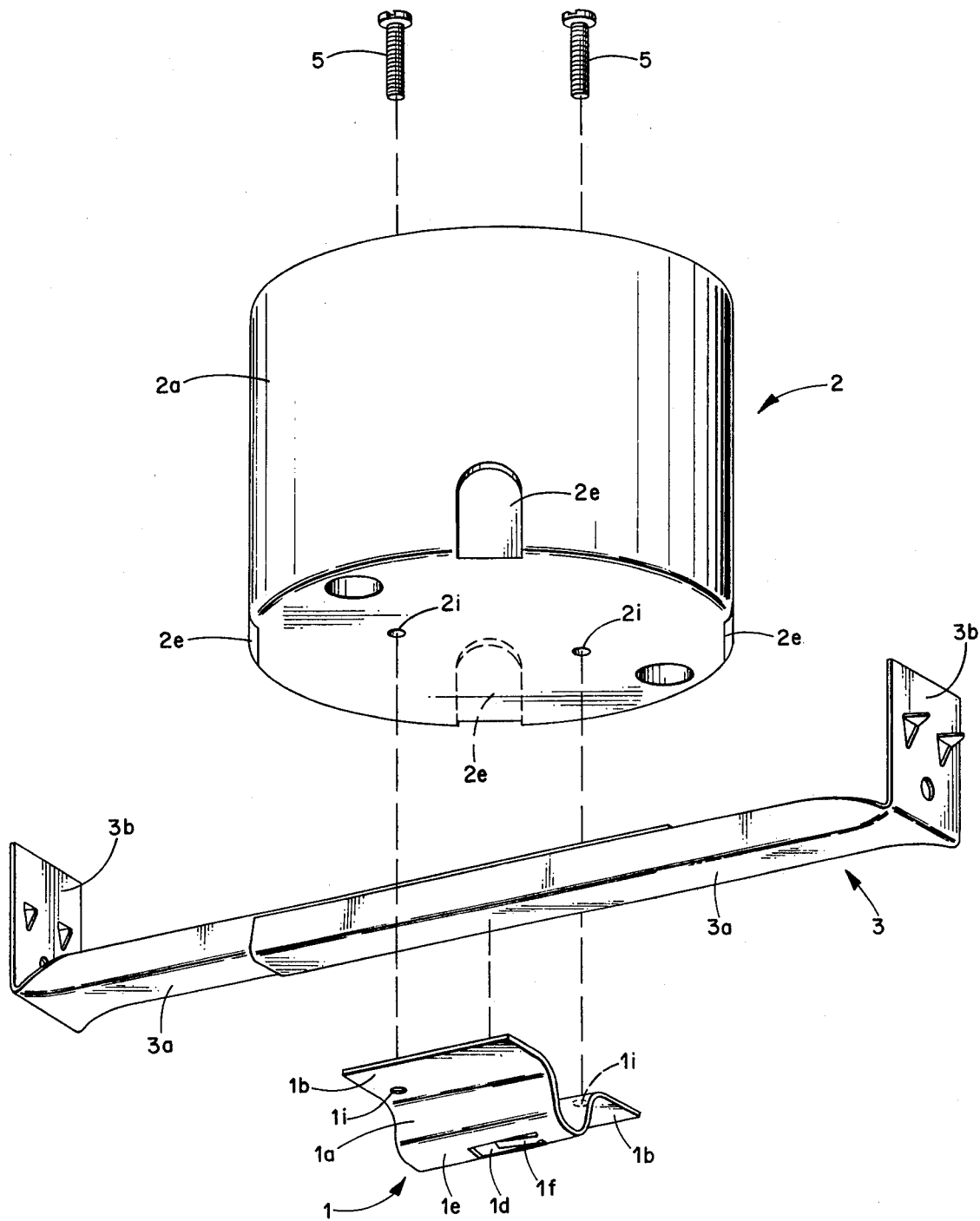
FIG. 1 is an exploded perspective view illustrating a clamp as employed with an electrical wiring box and bar hanger in accordance with the present invention, the aforesaid elements being illustrated in their positions at the time of assembly.

Referring now to FIG. 1, there is shown in a perspective view a clamp 1 as employed together with an electrical wiring box 2 and a bar hanger 3 in accordance with the present invention. The abovementioned elements 1, 2 and 3 are illustrated in FIG. 1 in their positions just prior to assembly.

Figure 2:
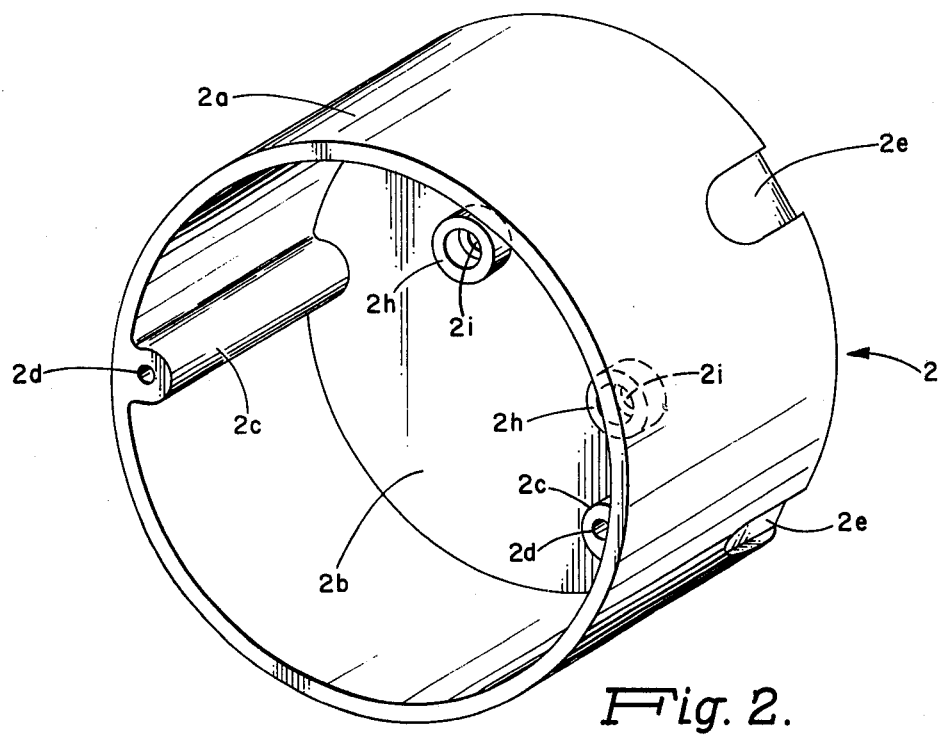
FIG. 2 is a perspective view of the electrical wiring box of FIG. 1 showing additional details of the electrical wiring box.

The electrical wiring box 2, which is shown in greatest detail in FIGS. 1 and 2, is of a ceiling-box type and includes a generally cylindrical wall 2a interconnected with a flat rear wall 2b. These walls define an opening at the front of the wiring box 2 and further enclose a space or volume for receiving an electrical device such as a light fixture, receptacle or switch as well as wires and other electrical connections associated with the electrical device. The electrical device is secured to the wiring box 2 by means of a pair of bosses 2c (FIG. 2) formed integrally with the cylindrical wall 2a, these bosses having openings 2d formed therein for receiving fasteners (e.g., threaded screws) for securing the electrical device to the bosses 2c. The cylindrical wall 2a further includes knockout elements 2e which may be removed selectively as desired for the entrance of wire cables to make electrical connections to an electrical device which is to be mounted within the wiring box 2. The electrical wiring box 2 as described hereinabove further includes a pair of spaced bosses 2h formed in the rear wall 2b thereof and surrounding a corresponding pair of openings 2i. As will be discussed in greater detail hereinafter, the openings 2i are employed to receive fasteners such as metal screws during the assembly together of the wiring box 2, the bar hanger 3 and the clamp 1. The electrical wiring box 2 as described hereinabove is suitably fabricated from a thermosetting plastic resin material, using standard techniques as are well understood by those skilled in the art.

The bar hanger 3 as employed in the present invention, shown in detail in FIG. 1, is also of a conventional design and includes first and second elongated channel members 3a, for example, of stamped and formed sheet metal, which are arranged to slide with respect to each other in a telescoping fashion to enable the bar hanger 3 to be adjusted by an installer in the field to accommodate a wide range of spacings between studs and joists. The channel members 3a further include conventional pronged attachment elements 3b at the remote ends thereof for attaching the bar hanger 3 and the wiring box 2 secured thereto to a pair of spaced-apart supporting structures such as wood studs or joists.

Figure 3:
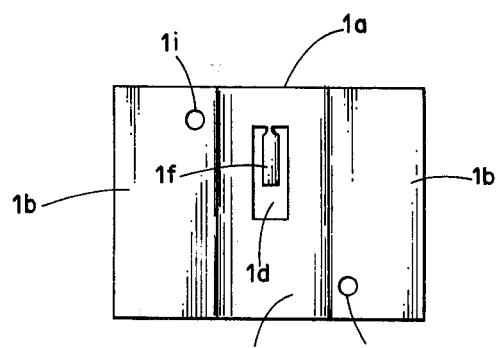
FIGS. 3, 4 and 5 are top, front and side views, respectively, of the clamp in accordance with the invention.
Figure 4:
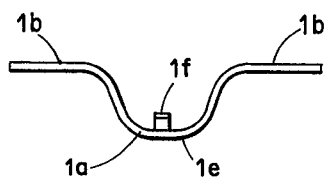
Figure 5:
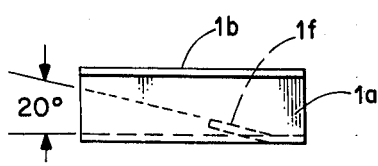

The clamp 1 as employed in accordance with the present invention with the wiring box 2 and the bar hanger 3 is shown in greatest detail in FIGS. 3-5 and includes a generally U-shaped portion 1a and a pair of flanges 1b integral with and on opposite sides of the U-shaped portion 1a. The U-shaped portion 1a is adapted to receive therein the bar hanger 2, as will be described hereinafter, and further has an opening 1d formed in a curved part 1e thereof and a deformable tab 1f adjacent to one edge of the opening 1d and extending upwardly at an angle (e.g., 20°), as best shown in FIGS. 4 and 5, into the region defined by the U-shaped portion 1a of the clamp 1. As will be described in detail hereinafter, the tab 1f is arranged to be deformed and to move downwardly to a position nearly flush with the curved part 1e of the U-shaped portion 1a during the assembly of the clamp 1 together with the bar hanger 3 and the wiring box 2. The flanges 1b of the clamp 1 further have openings 1i (FIG. 3) formed therein and located in the flanges 1b so that they can be aligned with the openings 2i in the rear wall 2b of the wiring box 1 during the assembly of the clamp 1 together with the bar hanger 2 and the wiring box 3. The clamp 1 as described hereinabove may be suitably fabricated from sheet metal, using well known metal stamping and forming techniques.

Figure 6:
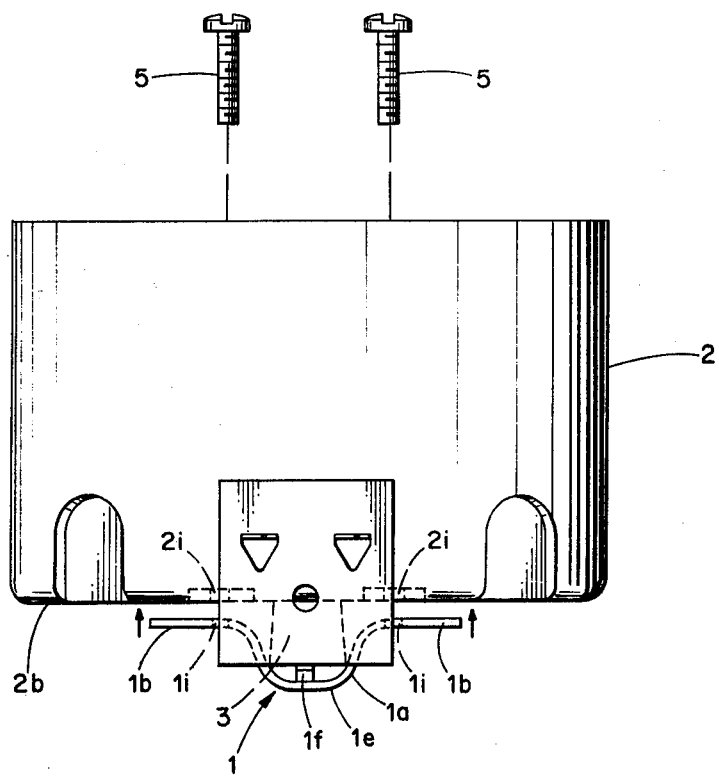
FIG. 6 is an end view illustrating the clamp, bar hanger and electrical wiring box as arranged prior to final assembly.
Figure 7:
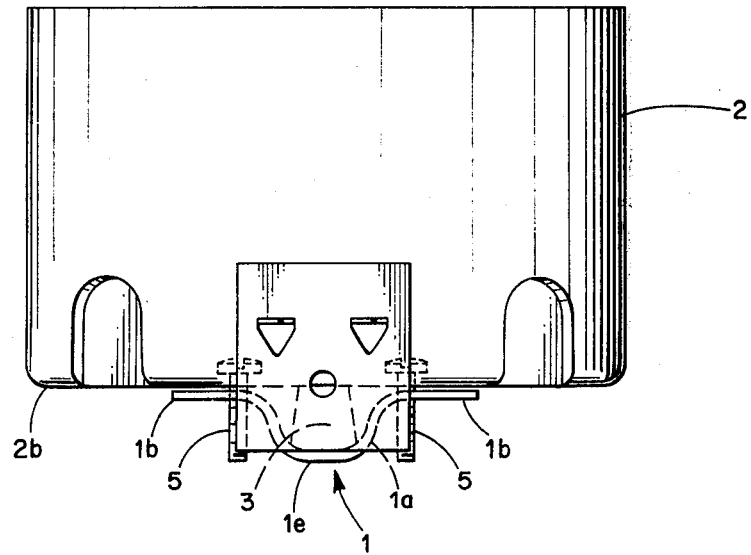
FIG. 7 is an end view illustrating the clamp, bar hanger and electrical wiring box in their final assembled form.

To assemble the clamp 1, the bar hanger 3 and the wiring box 2 together, specifically, to their final positions as indicated in FIG. 7, the bar hanger 3 is first placed within the U-shaped portion 1a of the clamp 1, for example, in a jig or clamping apparatus (not shown), and the wiring box 2 is oriented with respect to the clamp 1 and the bar hanger 3 so that the bar hanger 3 is captured between the clamp 1 and the rear wall 2b of the wiring box 2 and, in addition, the openings 2i in the wiring box 2 are aligned with the openings 1i in the flanges 1b of the clamp 1, as shown in FIG. 6. At this time, the presence of the upwardly-depending deformable tab 1f causes the clamp 1 to be spaced a slight distance from the surface of the rear wall 2b of the wiring box 2 and the tab 1f bears directly against the bottom surface of the bar hanger 3 with the curved part 1e of the clamp 1 being spaced a slight distance from the bottom surface of the bar hanger 3. A pair of metal screws, such as shown at 5 in FIGS. 1 and 6, are then inserted by standard screw-insertion apppparatus (not shown) through the openings 2i in the wiring box 2 and into the openings 1i in the clamp 1, and rotational torque is applied to the screws 5 to thread the screws 5 into the openings 1i in the clamp 1. As the screws 5 advance into the openings 1i, the clamp 1 is drawn toward the rear wall 2b of the wiring box 2, causing the tab 1f of the clamp 1 to deform and move downwardly in a direction away from the wiring box 2 and toward the curved part 1e of the clamp 1. The deformation of the tab 1f serves to distribute the torque or energy applied to the screws 5 over the entire clamp 1, principally to the U-shaped portion 1a, rather than principally to the flanges 1b. As a result of this distribution of the energy or torque, damage to the wiring box 2, specifically, cracking or shattering of the wiring box 2 in the region underlying the clamp 1, especially under the flanges 1b, is effectively prevented. When the clamp 1 has been completely secured to the wiring box 2, as indicated in FIG. 7, the flanges 1b of the clamp 1 nearly abut against the rear wall 2b of the wiring box 2, and the bar hanger 3 is retained within the U-shaped portion 1a of the clamp 1 and completely confined between the curved part 1e of the clamp 1 and the rear wall 2b of the wiring box 2. The tab 1f of the clamp 1 continues to bear against the bottom surface of the bar hanger 3 but it is now nearly flush with the bar hanger 3 and with the curved part 1e of the clamp 1.

It is believed that it will now be apparent that a clamp 1 has been described hereinabove which is simple in design and use and, by the simple provision of a deformable tab 1f as described hereinabove, is capable of reducing substantially the potential damage to thermosetting plastic wiring boxes such as cracking or shattering. In using the clamp 1 and deformable tab 1f as described hereinabove, it is unnecessary to alter the amount of energy or torque as is normally applied to screws used with the aforedescribed prior art clamps lacking the deformable tabs 1f as described hereinabove. Accordingly, there is no need to modify the existing screw-insertion apparatus as normally employed to secure the aforedescribed prior art clamps to thermosetting plastic wiring boxes.

While there has been described what is considered to be a preferred embodiment of the invention, it will be obvious to those skilled in the art that various changes and modifications may be made therein without departing from the invention as called for in the appended claims.

What is claimed is:

1. An assembly comprising:
   an electrical wiring box including a wall;
   a clamp including a generally U-shaped portion;
   a bar hanger disposed within the U-shaped portion of the clamp and captured between the generally U-shaped portion of the clamp and the wall of the wiring box; and
   securing means securing the clamp and the bar hanger within the generally U-shaped portion of the clamp directly to the wall of the wiring box;
   the improvement comprising:
      the generally U-shaped portion of the clamp has deformable means directed, prior to the clamp being secured to the wall of the wiring box, into the region defined by the generally U-shaped portion and bearing against the bar hanger, and operative during the securing of the clamp to the wall of the wiring box to deform and to move in a direction away from the wall of the wiring box and toward the generally U-shaped portion of the clamp.

2. An assembly in accordance with the claim 1 wherein:
   the deformable means includes a deformable tab directed at an angle from the horizontal portion of the clamp into the region defined by the generally U-shaped portion.

3. An assembly in accordance with claim 2 wherein: the electrical wiring box is formed of a thermosetting plastic composition.

4. An assembly in accordance with claim 1 wherein:
   the wall of the wiring box includes a pair of openings therein;
   the clamp further comprises:
      a first flange extending outwardly from one side of the generally U-shaped portion of the clamp and having an opening therein corresponding to one of the openings in the wall of the wiring box; and
      a second flange extending outwardly from the other side of the generally U-shaped portion of the clamp and having an opening therein corresponding to the other opening in the wall of the wiring box; and
   the securing means includes fastener means used with the openings in the wall of the wiring box and the openings in the first and second flanges for securing the clamp and the bar hanger within the generally U-shaped portion of the clamp to the wall of the wiring box.

5. An assembly in accordance with claim 4 wherein:
   the deformable means includes a deformable tab directed at an angle from the horizontal portion of the clamp into the region defined by the generally U-shaped portion.

6. An assembly in accordance with claim 5 wherein:
   the openings in the wall of the wiring box are unthreaded openings; and
   the openings in the flanges of the clamp are threaded.

7. An assembly in accordance with claim 6 wherein:
   the electrical wiring box is formed of a thermosetting plastic composition.

* * * * *